Feb. 10, 1931. P. LESCADIEU 1,792,381

LOCKING NUT

Filed July 11, 1928

Inventor
Paul Lescadieu
By Addison A. Armstrong
Attorney

Patented Feb. 10, 1931

1,792,381

UNITED STATES PATENT OFFICE

PAUL LESCADIEU, OF ATHUS, BELGIUM, ASSIGNOR TO PAUL ADNET, OF LYON, FRANCE

LOCKING NUT

Application filed July 11, 1928, Serial No. 291,796, and in Luxemburg July 13, 1927.

My invention relates to locking nuts and the object of the invention is to provide a simple device for locking or unlocking the nut at will which is very easy to use.

The invention consists in drilling a cylindrical hole tangentially in nut which impinges slightly on the screw-thread. In said hole are located, first a helical spring, then a locking ball, followed by a pin and finally a second ball, which is retained in the hole by burring over the surface of the nut, a part of the spherical segment of said second ball projecting beyond the nut.

My invention will be readily understood with reference to the accompanying drawing forming part of this specification when taken in connection with the following description.

In the drawing—

Figure 1:
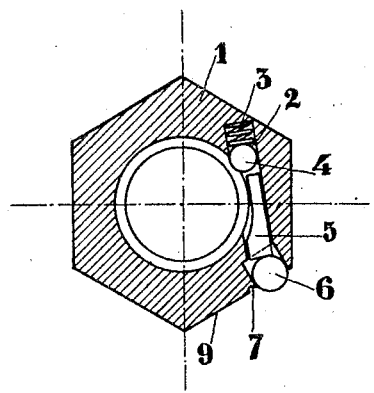
Fig. 1 is a cross-section of the nut and locking means.
Figure 2:
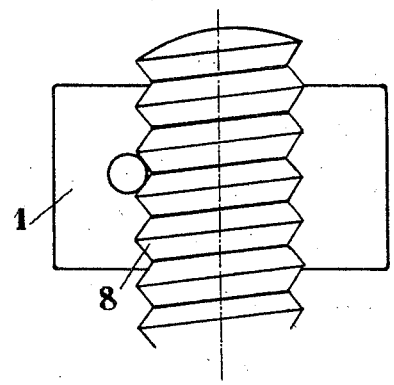
Fig. 2 is a diagrammatic cross-section of the nut with the bolt in elevation.
Figure 3:
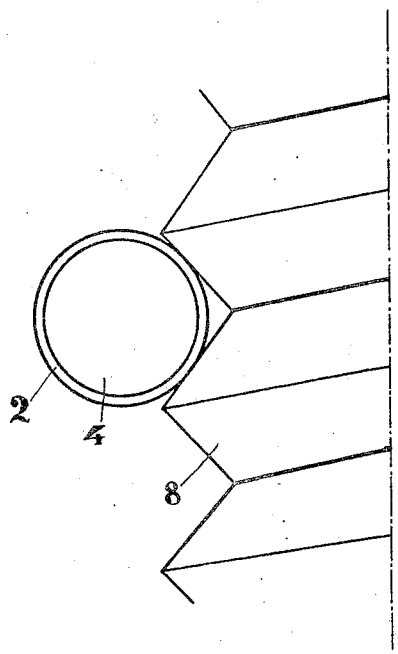
Figs. 3 and 4 illustrate the locking arrangement on a larger scale.
Figure 4:
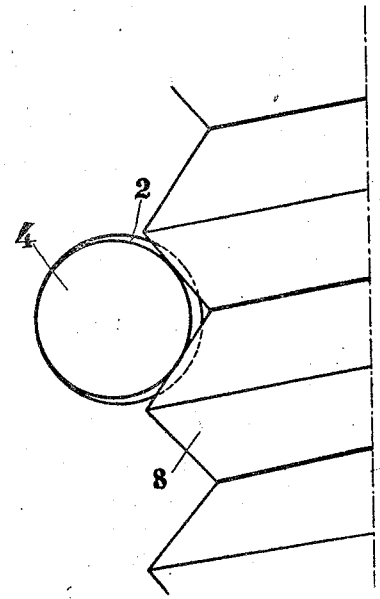

Referring to Fig. 1 the nut is drilled with a cylindrical hole 2 tangentially to the screw-thread and slightly impinging on the screw-thread of the bolt. Said hole 2 constitutes the seat for the locking means. At the bottom thereof is inserted a small helical spring 3 against which abuts a locking ball 4 of a diameter slightly less than that of the seat. Behind the ball 4 is inserted into the seat a pin 5, the purpose of which is to maintain the ball 4 under the desired tension. The length of pin 5, as well as that of the thrust spring 3, must therefore be proportioned to the calibre of the nut, so as to keep the locking ball within the limits of clearance which allows passing from locking to unlocking position.

When the nut 1 is screwed home, the ball 4 is pushed against the spring 3, which is slightly compressed and the screw slips, by pushing back the ball 4, so as to lock the nut 1 on the bolt. It is then necessary to wedge the ball 4 between the threaded part of the bolt and the wall of the seat by a slight slacking of the nut.

The fixing of the pin is easily effected by placing at the outlet of the hole 2 a second ball 6 which is held in the hole by a slight burr 7. A part of the spherical segment of this ball 6 should project beyond the plane of the surface 9 of the side of the nut.

Instead of being in line with pin 5, the axis of the hole of ball 6 is perpendicular to the flat of the nut in order to allow employing a large ball facilitating blocking on a small rod and unlocking on a large rod.

In addition, the hole perpendicular to the flat of the nut allows forming of a setting over the entire periphery of the ball assuring proper tightness thereabout in order to facilitate unlocking.

Slacking is effected with the greatest facility by means of a pipe-wrench, which, when placed against face 9 of the nut, exerts a pressure upon the control ball 6 and thus shifts the pin 5 sufficiently to release the locking ball 4.

Having described my invention what I claim as new and desire to secure by Letters Patent is—

A locking nut assembly comprising an internally threaded nut having a first hole formed therein substantially tangential with the threaded portion thereof, said nut having a second hole formed therein positioned out of alignment with said first hole and communicating at opposite extremities with said first hole and with the periphery of the nut, the axis of said second hole being normal to the side of the nut with which it communicates, locking means positioned in said first hole and including a ball, and a spring tending to move said ball towards the threaded portion of the nut, unlocking means including an unlocking pin having one end in contact with said ball, and a second ball positioned in said second hole and contacting with the opposite end of said unlocking pin, part of the surface of said second ball extending normally beyond the periphery of the nut, and means retaining said second ball within the second hole.

In testimony whereof I hereunto affix my signature.

PAUL LESCADIEU.